United States Patent
Morita et al.

(10) Patent No.: US 6,398,865 B1
(45) Date of Patent: Jun. 4, 2002

(54) CEMENT COMPOSITION

(75) Inventors: Yoshitsugu Morita, Chiba Prefecture; Masahiko Uomori, Tokyo; Kazuo Kobayashi, Chiba Prefecture, all of (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/661,419

(22) Filed: Sep. 13, 2000

(30) Foreign Application Priority Data

Sep. 24, 1999 (JP) ............................................ 11-269888

(51) Int. Cl.$^7$ ........................... C04B 28/04; C04B 24/40
(52) U.S. Cl. ...................... 106/806; 106/634; 106/696; 106/708; 106/724; 106/790; 106/823
(58) Field of Search ................................. 106/634, 696, 106/708, 724, 790, 806, 823

(56) References Cited

U.S. PATENT DOCUMENTS

| 4,394,335 A |   | 7/1983 | Roth et al. ..................... 264/82 |
| 5,712,343 A |   | 1/1998 | Geck et al. .................. 524/837 |
| 6,071,987 A | * | 6/2000 | Matsumoto et al. ........ 523/209 |

FOREIGN PATENT DOCUMENTS

| EP | 0247346 | 12/1987 | ........... C04B/28/18 |
| EP | 0592206 | 4/1994 | ........... C04B/41/64 |
| EP | 0811584 | 12/1997 | ........... C04B/24/42 |
| EP | 0964023 | 12/1999 | ............... C08J/3/03 |
| EP | 1086933 | 3/2001 | ........... C04B/24/42 |
| FR | 20449428 | * 3/1971 | |
| JP | 02-145467 | 6/1990 | |
| JP | 02-160651 | 6/1990 | |
| JP | 03-261642 | 11/1991 | |
| JP | 4-103304 | * 4/1992 | |
| JP | 05-306156 | 11/1993 | |

OTHER PUBLICATIONS

Derwent Abstract No. 1971–19688S, abstract of Japanese Patent Specification No. 71–009803 (Nov. 1971).*

* cited by examiner

Primary Examiner—Anthony Green
(74) Attorney, Agent, or Firm—Patricia M. Scaduto; James L. DeCesare

(57) ABSTRACT

A cement composition comprising (A) hydraulic cement, (B) a silicone oil emulsion containing crosslinked silicone particles with an average particle size of from 0.05 μm to 100 μm in drops of silicone oil with an average size of 0.1 μm to 500 μm dispersed in water, the particle size of the crosslinked silicone particles being smaller than the size of the silicone oil drops, in an amount such that the total weight of the silicone oil and crosslinked silicone particles in component (B) ranges from 0.1 parts by weight to 50 parts by weight per 100 parts by weight of component (A), and optionally (C) aggregate.

12 Claims, No Drawings

CEMENT COMPOSITION

BACKGROUND OF INVENTION

The present invention relates to a cement composition containing a silicone oil emulsion and more specifically to a cement composition having superior fluidity and exhibiting superior water repellency and resistance to cracking upon hardening. Cement compositions obtained by compounding silicone oil with hydraulic cement, KOKAI Hei 02-145467, KOKAI Hei 02-160651, and KOKAI Hei 03-261642, and a concrete or mortar composition, KOKAI Hei 05-306156 have been offered in order to obtain water-repellent cured products. However, the problem with cement composition obtained by compounding silicone oil in these compositions was that it was difficult to disperse silicone oil in hydraulic cement and the water repellent properties of the resultant cured cement products were insufficient. In addition, the problem with cement compositions obtained by compounding silicone rubber powder therein was that they lacked fluidity and the water repellent properties and resistance to cracking of the cured products of concrete or mortar obtained by curing them were insufficient. It is an object of the present invention to provide a cement composition having superior fluidity and exhibiting superior water repellency and resistance to cracking upon hardening.

SUMMARY OF INVENTION

The present invention is a cement composition comprising (A) hydraulic cement, (B) a silicone oil emulsion containing crosslinked silicone particles with an average particle size of from 0.05 $\mu$m to 100 $\mu$m in drops of silicone oil with an average size of 0.1 $\mu$m to 500 $\mu$m dispersed in water, the particle size of the crosslinked silicone particles being smaller than the size of the silicone oil drops, in an amount such that the total weight of the silicone oil and crosslinked silicone particles in component (B) ranges from 0.1 parts by weight to 50 parts by weight per 100 parts by weight of component (A), and optionally (C) aggregate.

DESCRIPTION OF INVENTION

The present invention is a cement composition comprising (A) hydraulic cement, (B) a silicone oil emulsion containing crosslinked silicone particles with an average particle size of from 0.05 $\mu$m to 100 $\mu$m in drops of silicone oil with an average size of 0.1 $\mu$m to 500 $\mu$m dispersed in water, the particle size of the crosslinked silicone particles being smaller than the size of the silicone oil drops, in an amount such that the total weight of the silicone oil and crosslinked silicone particles in component (B) ranges from 0.1 parts by weight to 50 parts by weight per 100 parts by weight of component (A), and optionally (C) aggregate.

The cement composition of the present invention is explained in detail hereinbelow. The hydraulic cement of component (A), which is the main component of the present composition, is a component that hardens on standing when mixed with water. A representative example of component (A) is Portland cement, which is prepared, for instance, by adding a cure modifier such as calcium sulfate (gypsum) to a clinker prepared by firing a raw material consisting of iron oxide, quartzite, clay, and lime (CaO) at a high temperature and then pulverizing the mixture. Examples of Portland cement include early strength Portland cement, ultra-high early strength Portland cement, moderate-heat Portland cement, sulfate-resisting Portland cement, and white Portland cement. Additionally, examples of the hydraulic cement of component (A) other than Portland cement include blast furnace cement, silica cement, fly ash cement, and alumina cement.

The silicone oil emulsion of component (B) is a component used to impart superior water repellency and cracking resistance to cured products of the present composition without decreasing the fluidity. The silicone oil emulsion of component (B) is characterized by containing crosslinked silicone particles with an average particle size of from 0.05 $\mu$m to 100 $\mu$m in drops of silicone oil with an average size of 0.1 $\mu$m to 500 $\mu$m dispersed in water, the particle size of the crosslinked silicone particles being smaller than the size of the silicone oil drops.

Silicone oils with a viscosity of from 1 mPa·s to 100,000,000 mPa·s at 25° C. are preferable, and silicone oils with a viscosity of from 2 mPa·s to 10,000,000 mPa·s at 25° C. are particularly preferable as the silicone oil of component (B). Examples of such silicone oils include oils having linear, partially branched linear, cyclic, or branched molecular structures, with oils having linear or cyclic structures being especially preferable. In addition, the silicone oil preferably does not contribute to the crosslinking reaction taking place when the crosslinked silicone particles are formed. Examples of silicone oils suggested in the case where the crosslinked silicone particles are crosslinked by means of a hydrosilylation reaction include compounds that have no alkenyl groups and no silicon-bonded hydrogen atoms, for instance dimethylpolysiloxane having both terminal ends of the molecular chain blocked with trimethylsiloxy groups, methylphenylpolysiloxane having both terminal ends of the molecular chain blocked with trimethylsiloxy groups, copolymer of methylphenylsiloxane and dimethylsiloxane having both terminal ends of the molecular chain blocked with trimethylsiloxy groups, copolymer of methyl(3,3,3-trifluoropropyl)siloxane and dimethylsiloxane having both terminal ends of the molecular chain blocked with trimethylsiloxy groups, cyclic dimethylsiloxane, and cyclic methylphenylsiloxane. Examples of silicone oils suggested in the case where the crosslinked silicone particles are crosslinked by means of a condensation reaction include compounds that have no silanol groups, silicon-bonded hydrogen atoms, or silicon-bonded hydrolyzable groups, for instance, silicone oils such as those mentioned above, and in addition dimethylpolysiloxane having both terminal ends of the molecular chain blocked with dimethylvinylsiloxy groups, copolymer of methylvinylsiloxane and dimethylsiloxane having both terminal ends of the molecular chain blocked with dimethylvinylsiloxy groups, methylvinylpolysiloxane having both terminal ends of the molecular chain blocked with trimethylsiloxy groups, and cyclic methylvinylsiloxane.

In component (B), the average size of the drops of silicone oil ranges from 0.1 $\mu$m to 500 $\mu$m, preferably, from 0.5 $\mu$m to 200 $\mu$m. This is due to the fact that when the average size of the drops of silicone oil is either below the lower limit of the above-mentioned range or exceeds the upper limit of the above-mentioned range, the stability of the emulsion tends to decrease.

In component (B) the average particle size of the crosslinked silicone particles ranges from 0.1 $\mu$m to 100 $\mu$m and preferably from 0.5 $\mu$m to 50 $\mu$m. This is due to the fact that when the average particle size of the crosslinked silicone particles is either below the lower limit of the above-mentioned range or exceeds the upper limit of the above-mentioned range, the stability of the emulsion tends to decrease. In component (B), the particle size of the crosslinked silicone particles must be smaller than the size of the drops of silicone oil. Spherical, spindle-shaped, oblate, or irregular shapes are suggested as examples of the shape of the crosslinked silicone particles, with the spherical shape being preferred.

Compositions crosslinkable by means of a hydrosilylation reaction, a condensation reaction, or a free radical reaction initiated by an organic peroxide are suggested as the crosslinkable silicone compositions used to form the crosslinked silicone particles, with compositions crosslinkable via a hydrosilylation reaction or a condensation reaction being preferred. Such crosslinkable silicone compositions are preferably compositions forming rubber-like or gel-like crosslinked products as a result of the crosslinking reaction.

A composition comprising at least an organopolysiloxane having at least two alkenyl groups in one molecule, an organopolysiloxane having at least two silicon-bonded hydrogen atoms in one molecule, and a hydrosilylation reaction catalyst is suggested as an example of a silicone composition crosslinkable by means of a hydrosilylation reaction. Vinyl, allyl, butenyl, pentenyl, and hexenyl are suggested as examples of the alkenyl groups contained in the organopolysiloxane, with vinyl being preferred. Also, methyl, ethyl, propyl, butyl, and other alkyl groups; cyclopentyl, cyclohexyl, and other cycloalkyl groups; phenyl, tolyl, xylyl, and other aryl groups; benzyl, phenylethyl, 3-phenylpropyl and other aralkyl groups; halogenated hydrocarbon groups, such as 3-chloropropyl and 3,3,3-trifluoropropyl, and other univalent hydrocarbon groups are suggested as examples of groups bonded to silicon atoms other than the alkenyl groups contained in the organopolysiloxane. Linear, cyclic, network, and partially branched linear structures are suggested as examples of the molecular structures of such an organopolysiloxane, with linear or partially branched linear structures being preferred in terms of forming elastomeric crosslinked silicone particles.

Additionally, there are no particular limitations concerning the viscosity of the organopolysiloxane so long as it permits dispersion of the crosslinkable silicone composition in water. Preferably, however, its viscosity is in the range of from 20 mPa·s to 100,000 mPa·s at 25° C., and, especially preferably, in the range of from 20 mPa·s to 10,000 mPa·s at 25° C.

The same univalent hydrocarbon groups as those mentioned above exemplify groups bonded to silicon atoms other than hydrogen atoms in the latter organopolysiloxane having silicon-bonded hydrogen atoms. Linear, cyclic, network, and partially branched linear structures are suggested as the molecular structures of such an organopolysiloxane. Additionally, there are no particular limitations concerning the viscosity of the organopolysiloxane so long as it permits dispersion of the crosslinkable silicone composition in water. Preferably, however, its viscosity is in the range of from 1 mPa·s to 10,000 mPa·s at 25° C. The content of the organopolysiloxane having silicon-bonded hydrogen atoms in the above-described crosslinkable silicone composition should be sufficient for the crosslinking of the above-mentioned composition. Preferably, the content is in the range of from 0.3 parts by weight to 200 parts by weight per 100 parts by weight of the organopolysiloxane having alkenyl groups bonded to silicon atoms.

The hydrosilylation reaction catalyst used in the above-described crosslinkable silicone composition is used to promote crosslinking of the composition and is preferably a platinum-based catalyst. Chloroplatinic acid, alcohol solutions of chloroplatinic acid, olefin complexes of platinum, alkenylsiloxane complexes of platinum, platinum black, and platinum on silica are suggested as such platinum-based catalysts. When preparing the silicone oil emulsion of component (B), a crosslinkable silicone composition containing a hydrosilylation reaction catalyst in water can be prepared by dispersing in water a crosslinkable silicone composition compounded with the above-mentioned hydrosilylation reaction catalyst in advance, or by dispersing in water a crosslinkable silicone composition that does not contain a catalyst, and then adding a catalyst. At such time, it is preferable to use an aqueous dispersion obtained by dispersing a hydrosilylation reaction catalyst with average particle size of not more than 1 $\mu$m. The content of the hydrosilylation reaction catalyst in the above-described crosslinkable silicone composition should be sufficient for promoting the crosslinking reaction of the crosslinkable silicone composition. For example, when a platinum-based catalyst is used as the hydrosilylation reaction catalyst, it is preferable to use the catalyst in an amount such that the content of platinum metal provided by the catalyst is in the range of from $1 \times 10^{-7}$~$1 \times 10^{-3}$ parts by weight per 100 parts by weight of the organopolysiloxane having alkenyl groups bonded to silicon atoms.

Also, a composition comprising at least a condensation reaction catalyst, such as an organotitanium compound or an organotin compound, a silane-based crosslinking agent having hydrolyzable groups, such as aminoxy, acetoxy, oxime, and alkoxy groups bonded to at least three silicon atoms in one molecule, and an organopolysiloxane having hydrolyzable groups such as aminoxy, acetoxy, oxime, and alkoxy, or hydroxyl groups bonded to at least two silicon atoms in one molecule is suggested as an example of a silicone composition crosslinkable by means of a condensation reaction.

Methoxy, ethoxy, and methoxyethoxy groups are suggested as examples of the alkoxy groups contained in the above organopolysiloxane having hydrolyzable groups. Also, dimethylketoxime and methylethylketoxime are suggested as examples of the oxime groups contained in the organopolysiloxane. Methyl, ethyl, propyl, butyl, and other alkyl groups; cyclopentyl, cyclohexyl, and other cycloalkyl groups; vinyl, allyl, butenyl, pentenyl, hexenyl and other alkenyl groups; phenyl, tolyl, xylyl, and other aryl groups; benzyl, phenylethyl, 3-phenylpropyl and other aralkyl groups; halogenated hydrocarbon groups, such as 3-chloropropyl and 3,3,3-trifluoropropyl, and other univalent hydrocarbon groups are suggested as examples of other groups bonded to silicon atoms in the organopolysiloxane. Linear, cyclic, network, and partially branched linear structures are suggested as examples of the molecular structures of such an organopolysiloxane, with linear or partially branched linear structures being especially preferable in terms of forming elastomeric crosslinked silicone particles. Additionally, there are no particular limitations concerning the viscosity of the organopolysiloxane having hydrolyzable groups so long as it permits dispersion of the crosslinkable silicone composition in water. Preferably, however, its viscosity is in the range of from 20 mPa·s to 100,000 mPa·s at 25° C., and, especially preferably, in the range of from 20 mPa·s to 10,000 mPa·s at 25° C.

In addition, the alkoxy groups and oxime groups contained in the silane-based crosslinking agent are exemplified by the same groups as those mentioned above. Methyltrimethoxysilane, vinyltrimethoxysilane, methyltrioximesilane, and vinyltrioximesilane are suggested as examples of such a silane-based crosslinking agent. In the above-described crosslinkable silicone composition, the content of the silane-based crosslinking agent should be sufficient for crosslinking the above-described composition, and preferably it should be in the range of from 0.3 parts by weight to 200 parts by weight per 100 parts by weight of the above-mentioned organopolysiloxane.

A condensation reaction catalyst such as organotin compounds or organotitanium compounds are used to promote the crosslinking of the above-described crosslinkable silicone composition by condensation reaction. Dibutyltin dilaurate, dibutyltin diacetate, tin octenoate, dibutyltin dioctate, tin laurate, tetrabutyl titanate, tetrapropyl titanate, and dibutoxybis(ethyl acetoacetate) are suggested as examples of such condensation catalysts. In the above-described crosslinkable silicone composition, the content of the condensation reaction catalyst should be sufficient for crosslinking the above-described composition, and preferably it should be in the range of from 0.01 parts by weight to 5 parts by weight, and especially preferably in the range of from 0.05 parts by weight to 2 parts by weight per 100 parts by weight of the above-mentioned organopolysiloxane having hydrolyzable groups.

In addition, fillers may be compounded with the above-described crosslinkable silicone compositions as optional components used to regulate the fluidity thereof or to improve the mechanical strength of the resultant crosslinked silicone particles.

Precipitated silica, fumed silica, calcined silica, fumed titanium oxide, and other reinforcing fillers; pulverized quartz, diatomaceous earth, aluminosilicic acid, iron oxide, zinc oxide, calcium carbonate, and other non-reinforcing fillers; fillers obtained by surface treating them with hexamethyldisilazane, trimethylchlorosilane, polydimethylsiloxane, polymethylhydrogensiloxane, and other organosilicon compounds are suggested as examples of such fillers.

The non-crosslinkable silicone oil contained in the crosslinkable silicone composition is an oil that does not contribute to the reaction of crosslinking of the composition. The viscosity at 25° C. of the non-crosslinkable silicone oil is preferably in the range of from 1 mPa·s to 100,000,000 mPa·s and especially preferably in the range of 2 mPa·s to 10,000,000 mPa·s. Silicone oils with linear, partially branched linear, cyclic, and branched molecular structures are preferably used as such non-crosslinkable silicone oils. Silicone oils having linear or cyclic molecular structures are especially preferred. When the above-mentioned composition is crosslinkable by means of a hydrosilylation reaction, silicone oils that have no alkenyl groups and no silicon-bonded hydrogen atoms, for instance, dimethylpolysiloxane having both terminal ends of the molecular chain blocked with trimethylsiloxy groups, methylphenylpolysiloxane having both terminal ends of the molecular chain blocked with trimethylsiloxy groups, copolymer of methylphenylsiloxane and dimethylsiloxane having both terminal ends of the molecular chain blocked with trimethylsiloxy groups, copolymer of methyl(3,3,3-trifluoropropyl)siloxane and dimethylsiloxane having both terminal ends of the molecular chain blocked with trimethylsiloxy groups, cyclic dimethylsiloxane, and cyclic methylphenylsiloxane are suggested as examples of the non-crosslinkable silicone oils. When the above-mentioned composition is crosslinked by means of a condensation reaction, silicone oils that have no silanol groups, silicon-bonded hydrogen atoms, or silicon-bonded hydrolyzable groups, for instance, silicone oils such as those mentioned above, and in addition dimethylpolysiloxane having both terminal ends of the molecular chain blocked with dimethylvinylsiloxy groups, copolymer of methylvinylsiloxane and dimethylsiloxane having both terminal ends of the molecular chain blocked with dimethylvinylsiloxy groups, methylvinylpolysiloxane having both terminal ends of the molecular chain blocked with trimethylsiloxy groups, and cyclic methylvinylsiloxane are suggested as examples the non-crosslinkable silicone oils.

It is necessary that the content of the non-crosslinkable silicone oil in the crosslinkable silicone composition should be an amount exceeding the amount at which the crosslinked product of the crosslinkable silicone composition can hold the non-crosslinkable silicone oil in the crosslinked product (in other words, the amount of non-crosslinkable silicone oil that can be contained in the crosslinked product). The amount that can be held varies depending on the combination of the crosslinkable silicone composition and the non-crosslinkable silicone oil; however, generally speaking, preferably the amount of non-crosslinkable silicone oil should range from 200 parts by weight to 5,000 parts by weight, and, especially preferably, from 250 parts by weight to 2,000 parts by weight per 100 parts by weight of the crosslinkable silicone composition.

As for the process used for the preparation of such an emulsion it is preferable to employ a process in which a crosslinkable silicone composition containing a non-crosslinkable silicone oil is subjected to a crosslinking reaction in an emulsified state in water. A process, in which the composition is dispersed in water using equipment such as a homomixer, a paddle mixer, a Henschel mixer, a homodisperser, a colloid mixer, an impeller agitator, a homogenizer, an in-line continuous emulsifier, an ultrasonic emulsifier, or a vacuum kneader is suggested as the process to be used for emulsifying the crosslinkable silicone composition in water. There are no limitations on the amount of water used, however it is preferably in the range of from 5 wt % to 99 wt % and especially preferably in the range of from 10 wt % to 80 wt % based on the total weight of the emulsion.

In order to stably emulsify the crosslinkable silicone composition in water, it is preferable to use a surface active agent such as polyoxyethylene alkyl ether, polyoxyethylene polyoxypropylene alkyl ether, polyoxyethylene alkyl phenyl ether, polyoxyethylene glycol fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, propylene glycol fatty acid ester, polyethylene glycol, polypropylene glycol, diethylene glycol trimethyl nonanol ethylene oxide adduct, and other nonionic surface active agents; hexylbenzenesulfonic acid, octylbenzenesulfonic acid, decylbenzenesulfonic acid, dodecylbenzenesulfonic acid, cetylbenzenesulfonic acid, myristylbenzenesulfonic acid, or their sodium salts and other anionic surface active agents; octyl trimethylammonium hydroxide, dodecyl trimethylammonium hydroxide, hexadecyl trimethylammonium hydroxide, octyl dimethylbenzylammonium hydroxide, decyl dimethylbenzylammonium hydroxide, dioctadecyl dimethylammonium hydroxide, beef tallow trimethylammonium hydroxide, coconut oil trimethylammonium hydroxide and other cationic surface active agents, as well as blends of two or more such surface active agents, with nonionic surface active agents being especially preferable. The amount of the surface active agent used preferably ranges from 0.1 wt % to 20 wt % and especially preferably from 0.5 wt % to 10 wt %.

The silicone oil emulsion of component (B) can be prepared by heating an emulsion of the crosslinkable silicone composition or by allowing it to stand at room temperature to subject the crosslinkable silicone composition dispersed in water to a crosslinking reaction.

In the present composition the total weight of the silicone oil and crosslinked silicone particles in component (B) ranges from 0.1 part by weight to 50 parts by weight, preferably from 0.1 part by weight to 30 parts by weight, more preferably from 0.1 part by weight to 20 parts by weight, and especially preferably from 0.5 part by weight to 20 parts by weight per 100 parts by weight of component (A). This is due to the fact that if the content of component (B) is below the lower limit of the above-mentioned range, the water repellent properties of the resultant cured cement products tend to decrease, and if it exceeds the upper limit of the above-mentioned range the strength of the resultant cured cement products tends to decrease.

In the present composition, the aggregate of component (C) is a component that is added as needed. If the present composition is a mortar composition, component (C) can be fine aggregate, such as sand, for example, river sand, pit sand, mountain sand, and quartz sand; and if the present composition is a concrete composition, component (C) can be fine aggregate, such as sand, or a coarse aggregate, such as river gravel, pit gravel, and crushed rock. Additionally, hemihydrate gypsum, slaked lime, calcium carbonate, dolomite plaster, clay, volcanic ash, and other non-aggregates, as well as organic polymer emulsions, latexes, fibers, and water-soluble high polymers can be added as other optional components to the present composition.

The present composition in which the silicone oil emulsion of component (B) is used can be cured by the addition of water if necessary. At such time, the total amount of the water compounded therewith is preferably from 10 parts by weight to 100 parts by weight relative to the weight of the hydraulic cement of component (A). As concerns the method used for mixing the above-mentioned components and water, it is preferable to use a mixer, such as a cement mixer. In particular because the silicone oil emulsion of component (B) is used in the present composition an excellent dispersion thereof in the cement composition can be produced.

APPLICATION EXAMPLES

The cement composition of the present invention is explained below in detail by referring to application examples. All viscosities reported in the examples are as measured at 25° C.

Reference Example 1

A crosslinkable silicone composition was prepared by mixing 18.8 parts by weight of a dimethylpolysiloxane with a viscosity of 400 mPa·s having both terminal ends of the molecular chain blocked with dimethylvinylsiloxy groups, 1.2 parts by weight of a copolymer of methylhydrogensiloxane and dimethylsiloxane with a viscosity of 30 mPa·s having both terminal ends of the molecular chain blocked with trimethylsiloxy groups, and 80 parts by weight of a dimethylpolysiloxane with a viscosity of 100 mPa·s having both terminal ends of the molecular chain blocked with trimethylsiloxy groups. A 3 wt % aqueous solution of polyoxyethylene nonyl phenyl ether (HLB=13.1) in an amount of 53 parts by weight was added to the crosslinkable silicone composition and the mixture was emulsified to form an aqueous emulsion of the crosslinkable silicone composition.

A separately prepared aqueous emulsion of platinum catalyst consisting of a 1,3-divinyltetramethyldisiloxane solution, whose main ingredient was a 1,3-divinyltetramethyldisiloxane complex of platinum (average particle size of platinum catalyst=0.05 μm, platinum metal concentration=0.05 wt %), was uniformly mixed with the above-mentioned aqueous emulsion of the crosslinkable silicone composition in an amount which provided a content of platinum metal of 20 ppm (by weight) relative to the dimethylpolysiloxane having both terminal ends of the molecular chain blocked with dimethylvinylsiloxy groups contained in the emulsion.

The emulsion was allowed to stand for one day at room temperature to allow the crosslinking of the crosslinkable silicone composition by means of a hydrosilylation reaction, thereby preparing a silicone oil emulsion containing crosslinked silicone particles in drops of silicone oil dispersed in water. Some of the emulsion was transferred to an aluminum plate with a diameter of 5 cm and water was removed therefrom by air-drying for 3 days thereby forming a silicone composition consisting of silicone oil and crosslinked silicone particles. The silicone composition had a cream-like appearance. Observation of the silicone composition using a stereoscopic microscope revealed that the crosslinked silicone particles were uniformly dispersed in the silicone oil and that the crosslinked silicone particles were spherical in shape.

Reference Example 2

A crosslinkable composition was prepared by mixing 17.8 parts by weight of a dimethylpolysiloxane with a viscosity of 400 mPa·s having both terminal ends of the molecular chain blocked with dimethylvinylsiloxy groups, 1.3 parts by weight of a copolymer of methylhydrogensiloxane and dimethylsiloxane with a viscosity of 30 mPa·s having both molecular terminals blocked with trimethylsiloxy groups (content of silicon-bonded hydrogen atoms=0.5 wt %), 0.2 parts by weight of a silicone resin with an average molecular weight of 4600, represented by the average unit formula:

$((CH_3)_3SiO_{1/2})_{0.6}((CH_3)_2CH_2\!=\!CHSiO_{1/2})_{0.1}(SiO_{4/2})_{1.0}$, and 80.7 parts by weight of a dimethylpolysiloxane with a viscosity of 100 mPa·s having both molecular terminals blocked with trimethylsiloxy groups. Next, after adding 53 parts by weight of a 3 wt % aqueous solution of polyoxyethylene nonyl phenyl ether (HLB=13.1) to the crosslinkable silicone composition, the mixture was emulsified to form an aqueous emulsion of the crosslinkable silicone composition.

The emulsion was allowed to stand for one day at room temperature to allow the crosslinking of the crosslinkable silicone composition by means of a hydrosilylation reaction thereby preparing a silicone oil emulsion containing crosslinked silicone particles in drops of silicone oil dispersed in water. Some of the emulsion was transferred to an aluminum plate with a diameter of 5 cm, and water was removed therefrom by air-drying for 3 days thereby preparing a silicone composition consisting of silicone oil and crosslinked silicone particles. The silicone composition had a cream-like appearance. Observation of the silicone composition using a stereoscopic microscope revealed that the crosslinked silicone particles were uniformly dispersed in the silicone oil and that the crosslinked silicone particles were spherical in shape.

Reference Example 3

A silicone rubber composition was prepared by uniformly mixing 94 parts by weight of a dimethylpolysiloxane with a viscosity of 400 mPa·s having both terminal ends of the molecular chain blocked with dimethylvinylsiloxy groups, 6 parts by weight of a copolymer of methylhydrogensiloxane and dimethylsiloxane with a viscosity of 50 mPa·s having both terminal ends of the molecular chain blocked with trimethylsiloxy groups, as well as platinum catalyst (platinum metal concentration=1 wt %) consisting of a solution of 1,3-divinyltetramethyldisiloxane, whose main ingredient was a 1,3-divinyltetramethyldisiloxane complex of platinum, in an amount such that the content of platinum metal was 20 ppm (by weight) relative to the total weight of the above-mentioned organopolysiloxane. A silicone rubber sheet was fabricated by heating the silicone rubber composition in an oven at 100° C. for 1 hour. The Type A durometer hardness of the silicone rubber sheet determined in accordance with JIS K 6253 was 30. Next, the silicone rubber sheet was milled into powder in a stone grist mill thereby preparing silicone rubber particles of irregular shape with an average particle size of about 1 mm.

Reference Example 4

A 67 wt % aqueous emulsion of silicone oil was prepared by quickly mixing 100 parts by weight of a dimethylpolysiloxane with a viscosity of 100 mPa·s having both terminal ends of the molecular chain blocked with trimethylsiloxy groups with 50 parts by weight of a 1.5 wt % aqueous solution of polyoxyethylene (9 moles adducted) nonyl phenyl ether and emulsifying the mixture in a colloid mill. Measurements performed using laser particle size determination revealed that the average particle size of the silicone oil in the emulsion was 0.5 µm and the maximum particle size

Application Example 1

A cement composition was prepared by mixing at room temperature 100 parts by weight of Portland cement (from Chuo Chemical Co., Inc.), 300 parts by weight of Toyoura sand, 7.7 parts by weight of the silicone oil emulsion prepared in Reference Example 1, 20 parts by weight of a styrene-butadiene rubber emulsion (TOMAK Super from Japan Latex Industry Co., Ltd.) with a solid matter content of 45 wt % and water in a quantity sufficient to bring the water content of the resultant cement composition to 50 wt %. The flow of the cement composition was measured in accordance with JIS R 5201-1992 (Physical testing methods for cement). The results are given in Table 1.

Next, a cured cement article was formed by casting the above-described cement composition in a form and allowing it to harden for one day in warm water at 70° C. in accordance with JCI-SSE4 (accelerated strength testing method using warm water at 70° C.) and curing it by drying for 7 days in air at 20° C. with a RH (relative humidity) value of 50%. The characteristics of the cured article were measured in the following manner.

Air content: calculated by subtracting from 100% the ratio (%) of the unit volume weight of the prepared cured cement article to the unit volume weight of an ideal cured cement article having no voids.

Chloride ion penetration depth: the four sides of a 40 mm×40 mm×80 mm cured cement article other than the two sides in contact with the form were sealed with an epoxy resin-based coating material. After immersing the cured cement article into a 2.5% sodium chloride solution (20° C.) for seven days its weight increase was calculated as a percentage.

Neutralization depth: the four sides of a 40 mm×40 mm×80 mm cured cement article other than the two sides in contact with the form were sealed with an epoxy resin-based coating material. After allowing the cured cement article to stand in an accelerated neutralization tester (30° C., RH: 60%, $CO_2$ concentration: 5%) for 14 days, the cured article was broken in two, and the surface of the cleft was sprayed with a 1% alcohol solution of phenolphthalein. The portion that did not turn red was considered to be the neutralized region and its depth was measured using calipers.

Coefficient of water absorption: determined in accordance with JIS A 6203-1980 (Polymer Dispersions for Cement Compounding). A 40 mm×40 mm×160 mm cured cement article was dried in a dryer (80° C.) until its weight stabilized and then immersed in water (20° C.). The percentage of weight increase after 48 hours of immersion was calculated based on the weight prior to the immersion.

Strength: the flexural strength and compressive strength of a 40 mm×40 mm×160 mm cured cement article were measured in accordance with JIS R 5201-1992 (Physical testing methods for cement).

Application Example 2

A cement composition was prepared by mixing at room temperature 100 parts by weight of Portland cement (from Chuo Chemical Co., Inc.), 300 parts by weight of Toyoura sand, 7.7 parts by weight of the silicone oil emulsion prepared in Reference Example 2, 20 parts by weight of a styrene-butadiene rubber emulsion (TOMAK Super from Japan Latex Industry Co., Ltd.) with a solid matter content of 45 wt %, and water in a quantity sufficient to bring the water content of the resultant cement composition to 50 wt %. The flow of the cement composition was measured in the same manner as in Application Example 1 and the results are given in Table 1. Next, the above-described cement composition was cured in the same manner as in Application Example 1 to form a cured cement article. The characteristics of the cured cement article were measured in the same manner as in Application Example 1 and the results are given in Table 1.

Application Example 3

A cement composition was prepared by mixing at room temperature 100 parts by weight of Portland cement (from Chuo Chemical Co., Inc.), 300 parts by weight of Toyoura sand, 23.1 parts by weight of the silicone oil emulsion prepared in Reference Example 3, 20 parts by weight of a styrene-butadiene rubber emulsion (TOMAK Super from Japan Latex Industry Co., Ltd.) with a solid matter content of 45 wt %, and water in a quantity sufficient to bring the water content of the resultant cement composition to 50 wt %. The flow of the cement composition was measured in the same manner as in Application Example 1 and the results are given in Table 1. Next, the above-described cement composition was cured in the same manner as in Application Example 1 to form a cured cement article. The characteristics of the cured cement article were measured in the same manner as in Application Example 1 and the results are given in Table 1.

Comparative Example 1

A cement composition was prepared by mixing at room temperature 100 parts by weight of Portland cement (from Chuo Chemical Co., Inc.), 300 parts by weight of Toyoura sand, 20 parts by weight of a styrene-butadiene rubber emulsion (TOMAK Super from Japan Latex Industry Co., Ltd.) with a solid matter content of 45 wt %, and water in a quantity sufficient to bring the water content of the resultant cement composition to 50 wt %. The flow of the cement composition was measured in the same manner as in Application Example 1 and the results are given in Table 1. Next, the above-described cement composition was cured in the same manner as in Application Example 1 to form a cured cement article. The characteristics of the cured cement article were measured in the same manner as in Application Example 1 and the results are given in Table 1.

Comparative Example 2

A cement composition was prepared by mixing at room temperature 100 parts by weight of Portland cement (from Chuo Chemical Co., Inc.), 300 parts by weight of Toyoura sand, 5 parts by weight of the silicone rubber particles prepared in Reference Example 3, 20 parts by weight of a styrene-butadiene rubber emulsion (TOMAK Super from Japan Latex Industry Co., Ltd.) with a solid matter content of 45wt %, and water in a quantity sufficient to bring the water content of the resultant cement composition to 50 wt %. The flow of the cement composition was measured in the same manner as in Application Example 1 and the results are given in Table 1. Next, the above-described cement composition was cured in the same manner as in Application Example 1 to form a cured cement article. The characteristics of the cured cement article were measured in the same manner as in Application Example 1 and the results are given in Table 1.

Comparative Example 3

A cement composition was prepared by mixing at room temperature 100 parts by weight of Portland cement (from Chuo Chemical Co., Inc.), 300 parts by weight of Toyoura sand, 7.7 parts by weight of the silicone oil emulsion prepared in Reference Example 4, 20 parts by weight of a styrene-butadiene rubber emulsion (TOMAK Super from Japan Latex Industry Co., Ltd.) with a solid matter content of 45wt %, and water in a quantity sufficient to bring the water content of the resultant cement composition to 50 wt %. The flow of the cement composition was measured in the same manner as in Application Example 1 and the results are given in Table 1. Next, the above-described cement composition was cured in the same manner as in Application Example 1 to form a cured cement article. The characteristics of the cured cement article were measured in the same manner as in Application Example 1 and the results are given in Table 1.

TABLE 1

| Item | App. Ex. 1 | App. Ex. 2 | App. Ex. 3 | Comp. Ex. 1 | Comp. Ex. 2 | Comp. Ex. 3 |
|---|---|---|---|---|---|---|
| Flow (cm) | 171 | 166 | 174 | 155 | 124 | 170 |
| Air content (%) | 6.0 | 5.9 | 4.2 | 8.3 | 9.5 | 6.2 |
| Chloride ion penetration depth (mm) | 3.4 | 3.0 | 2.4 | 5.4 | 6.2 | 4.7 |
| Neutralization depth (mm) | 2.6 | 2.7 | 2.0 | 5.0 | 5.2 | 3.3 |
| Coefficient of water absorption (%) | 1.2 | 1.4 | 0.9 | 2.2 | 1.8 | 1.5 |
| Flexural strength (kgf/cm$^2$) | 111 | 118 | 120 | 110 | 95 | 100 |
| Compressive strength (kgf/cm$^2$) | 365 | 382 | 377 | 365 | 321 | 235 |

We claim:

1. A cement composition comprising (A) hydraulic cement, (B) a silicone oil emulsion containing crosslinked silicone particles with an average particle size of from 0.05 $\mu$m to 100 $\mu$m in drops of silicone oil with an average size of 0.1 $\mu$m to 500 $\mu$m dispersed in water, the particle size of the crosslinked silicone particles being smaller than the size of the silicone oil drops, in an amount such that the total weight of the silicone oil and crosslinked silicone particles in component (B) ranges from 0.1 parts by weight to 50 parts by weight per 100 parts by weight of component (A), and optionally (C) aggregate.

2. The cement composition of claim 1, where the silicone oil of component (B) has a viscosity of from 1 mPa·s to 100,000,000 mPa·s at 25° C.

3. The cement composition of claim 1, where the crosslinked silicone particles of component (B) are crosslinked by means of a hydrosilylation reaction or a condensation reaction.

4. The cement composition of claim 1, where component (B) is a silicone oil emulsion obtained by crosslinking, in an emulsified state in water, a crosslinkable silicone composition containing a non-crosslinkable silicone oil, the content of the non-crosslinkable silicone oil being an amount exceeding the amount at which the crosslinked product of the crosslinkable silicone composition can hold the non-crosslinkable silicone oil.

5. The cement composition of claim 1, where the silicone oil of component (B) has a viscosity of from 2 mPa·s to 10,000,000 mPa·s at 25° C.

6. The cement composition of claim 1, where the average size of the drops of silicone oil range from 0.5 $\mu$m to 200 $\mu$m.

7. The cement composition of claim 1, where the average particle size of the crosslinked silicone particles ranges from 0.1 $\mu$m to 50 $\mu$m.

8. The cement composition of claim 1 comprising a non-crosslinkable silicone oil contained in the crosslinked silicone particles.

9. The cement composition of claim 8, where the non-crosslinkable silicone oil contained in the crosslinked silicone particles has a viscosity in the range of from 2 mP·s to 10,000,000 mP·s at 25° C.

10. The cement composition of claim 4, where the amount of the non-crosslinkable silicone oil is in a range of from 200 parts by weight to 5,000 parts by weight per 100 parts by weight of the crosslinkable silicone composition.

11. The cement composition of claim 4, where the amount of the non-crosslinkable oil is in a range of from 250 parts by weight to 2,000 parts by weight per 100 parts by weight of the crosslinkable silicone composition.

12. The cement composition of claim 1, where the total weight of the silicone oil and crosslinked silicone particles in component (B) ranges from 0.5 part by weight to 20 parts by weight per 100 parts by weight of component (A).

* * * * *